United States Patent
Satoh et al.

(10) Patent No.: US 9,406,000 B2
(45) Date of Patent: Aug. 2, 2016

(54) IMAGING DEVICE, COLORIMETRY DEVICE, AND IMAGE FORMING APPARATUS

(71) Applicants: Nobuyuki Satoh, Kanagawa (JP); Mamoru Yorimoto, Kanagawa (JP); Kenji Morita, Tokyo (JP); Masaya Kawarada, Kanagawa (JP); Daisaku Horikawa, Kanagawa (JP)

(72) Inventors: Nobuyuki Satoh, Kanagawa (JP); Mamoru Yorimoto, Kanagawa (JP); Kenji Morita, Tokyo (JP); Masaya Kawarada, Kanagawa (JP); Daisaku Horikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/963,901

(22) Filed: Dec. 9, 2015

(65) Prior Publication Data
US 2016/0171348 A1    Jun. 16, 2016

(30) Foreign Application Priority Data

Dec. 10, 2014 (JP) ................................. 2014-250251

(51) Int. Cl.
| | |
|---|---|
| *B41J 29/393* | (2006.01) |
| *G06K 15/02* | (2006.01) |
| *H04N 1/60* | (2006.01) |
| *H04N 1/00* | (2006.01) |

(52) U.S. Cl.
CPC .......... *G06K 15/027* (2013.01); *H04N 1/00251* (2013.01); *H04N 1/6033* (2013.01)

(58) Field of Classification Search
CPC ............ B41J 2/451; B41J 2/442; B41J 2/455; B41J 2/06; B41J 2/09
See application file for complete search history.

(56) References Cited

U.S. PATENT DOCUMENTS

| | | | | | |
|---|---|---|---|---|---|
| 7,192,153 | B2 * | 3/2007 | Aoshima | ................ | G02B 27/20 362/109 |
| 8,562,171 | B2 * | 10/2013 | Kamei | .................. | G02B 6/001 362/217.05 |
| 8,891,571 | B2 * | 11/2014 | Jikutani | .................. | B41J 2/442 347/130 |

(Continued)

FOREIGN PATENT DOCUMENTS

| | | |
|---|---|---|
| JP | 4671117 | 1/2011 |
| JP | 2013-224924 | 10/2013 |
| JP | 2013-228368 | 11/2013 |

OTHER PUBLICATIONS

U.S. Appl. No. 14/789,015, filed Jul. 1, 2015.

(Continued)

*Primary Examiner* — Lamson Nguyen
(74) *Attorney, Agent, or Firm* — Oblon, McClelland, Maier & Neustadt, L.L.P.

(57) ABSTRACT

An imaging device includes: a sensor unit that is arranged at a predetermined position inside a casing, and that images a subject outside the casing through an opening portion, with a part of an imaging region, while imaging a reference chart with another part of the imaging region; and a light absorption member that is arranged in an optical path of light from a illumination light source toward a specular-reflection position from which specular-reflection light of the illumination light source is entered to the sensor unit, in the imaging range. The light absorption member has at least a first surface on which light from the illumination light source toward the specular-reflection position is irradiated, and a second surface that faces to the first surface, and reflected light that has been reflected on the first surface and then on the second surface is further directed toward the first surface.

10 Claims, 18 Drawing Sheets

(56) References Cited

U.S. PATENT DOCUMENTS

| | | |
|---|---|---|
| 2007/0064174 A1 | 3/2007 | Kitamura et al. |
| 2012/0069411 A1 | 3/2012 | Satoh et al. |
| 2012/0236308 A1 | 9/2012 | Satoh |
| 2013/0027720 A1 | 1/2013 | Satoh |
| 2013/0027721 A1 | 1/2013 | Kobayashi et al. |
| 2013/0135484 A1 | 5/2013 | Satoh et al. |
| 2013/0208289 A1 | 8/2013 | Satoh et al. |
| 2013/0229671 A1 | 9/2013 | Yokozawa et al. |
| 2013/0242319 A1 | 9/2013 | Suzuki et al. |
| 2013/0242320 A1 | 9/2013 | Suzuki et al. |
| 2013/0242321 A1 | 9/2013 | Okada et al. |
| 2013/0242361 A1 | 9/2013 | Matsumoto et al. |
| 2013/0258368 A1 | 10/2013 | Shigemoto et al. |
| 2013/0258369 A1 | 10/2013 | Suzuki et al. |
| 2014/0218754 A1 | 8/2014 | Satoh et al. |
| 2015/0070737 A1 | 3/2015 | Hirata et al. |
| 2015/0085305 A1 | 3/2015 | Suzuki et al. |
| 2015/0109646 A1 | 4/2015 | Yokozawa et al. |
| 2015/0146053 A1 | 5/2015 | Satoh et al. |
| 2015/0158309 A1 | 6/2015 | Fujii et al. |
| 2015/0162372 A1 | 6/2015 | Yorimoto et al. |

OTHER PUBLICATIONS

U.S. Appl. No. 14/753,729, filed Jun. 29, 2015.
U.S. Appl. No. 14/565,182, filed Dec. 9, 2014.
U.S. Appl. No. 14/812,045, filed Jul. 29, 2015.

* cited by examiner

IMAGING DEVICE, COLORIMETRY DEVICE, AND IMAGE FORMING APPARATUS

CROSS-REFERENCE TO RELATED APPLICATIONS

The present application claims priority to and incorporates by reference the entire contents of Japanese Patent Application No. 2014-250251 filed in Japan on Dec. 10, 2014.

BACKGROUND OF THE INVENTION

1. Field of the Invention

The present invention relates to an imaging device, a colorimetry device, and an image forming apparatus.

2. Description of the Related Art

Conventionally, an imaging device has been known that images a patch recorded on a recording medium by an image forming apparatus using a coloring material such as ink, and that calculates a colorimetry value of the patch by converting an RGB value of the patch obtained by imaging into a color specification value in a standard color space (for example, Japanese Laid-open Patent Publication No. 2013-224924). The colorimetry value of the patch calculated by the imaging device is used for color adjustment in the image forming apparatus. Moreover, color adjustment in the image forming apparatus can be performed by using the RGB value obtained by imaging.

In this type of imaging device, an illumination light source such as a light emitting diode (LED) to illuminate an imaging range of a sensor unit that images an image is provided. Because the illumination light source has a directivity, when intense light of the illumination light source reflected by specular-reflection within the imaging range of the sensor unit enters the sensor unit, a proper RGB value cannot be obtained, and there is apprehension that it causes a problem in colorimetry of the patch, color adjustment of the image forming apparatus, and the like. Therefore, the imaging device described in Japanese Laid-open Patent Publication No. 2013-224924 has a configuration that a light diffuser is arranged in an optical path of light of direction reflection, and light from a light source is diffused by this light diffuser to a different direction from a sensor unit.

However, with the configuration described in Japanese Laid-open Patent Publication No. 2013-224924, it is difficult to avoid entrance of entire reflected light that is reflected on the light diffuser into the sensor unit, and there is a case in which a signal in a region in which the reflected light from the light diffuser forms an image can approach the saturation level. There is a problem that if the signal of the region of the light diffuser approaches the saturation level, it becomes difficult to acquire an RGB value that is used for colorimetry of a patch or color adjustment of an image forming apparatus properly from an image due to influence of flare, smear, blooming, and the like.

SUMMARY OF THE INVENTION

It is an object of the present invention to at least partially solve the problems in the conventional technology.

An imaging device includes: a casing that includes an opening portion; a reference chart that is arranged at a different position from the opening portion of the casing; a sensor unit that is arranged at a predetermined position inside the casing, and that images a subject outside the casing through the opening portion, with a part of an imaging region, while imaging the reference chart with another part of the imaging region; an illumination light source that illuminates at least the imaging region of the sensor unit; and a light absorption member that is arranged in an optical path of light from the illumination light source toward a specular-reflection position, when a position from which specular-reflection light of the illumination light source is entered to the sensor unit, in the imaging range of the sensor unit is the specular-reflection position. The light absorption member has at least a first surface on which light from the illumination light source toward the specular-reflection position is irradiated, and a second surface that faces to the first surface, and reflected light that has been reflected on the first surface and then on the second surface is further directed toward the first surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An imaging device, a colorimetry device, and an image forming apparatus according to an embodiment of the present invention are explained in detail below with reference to the accompanying drawings. Although an inkjet printer is exemplified as an example of an image forming apparatus to which the present invention is applied in the embodiment explained below, the present invention is widely applicable to various types of image forming apparatus that print an image on a recording medium.

First Embodiment

Mechanical Structure of Image Forming Apparatus

Figure 1:
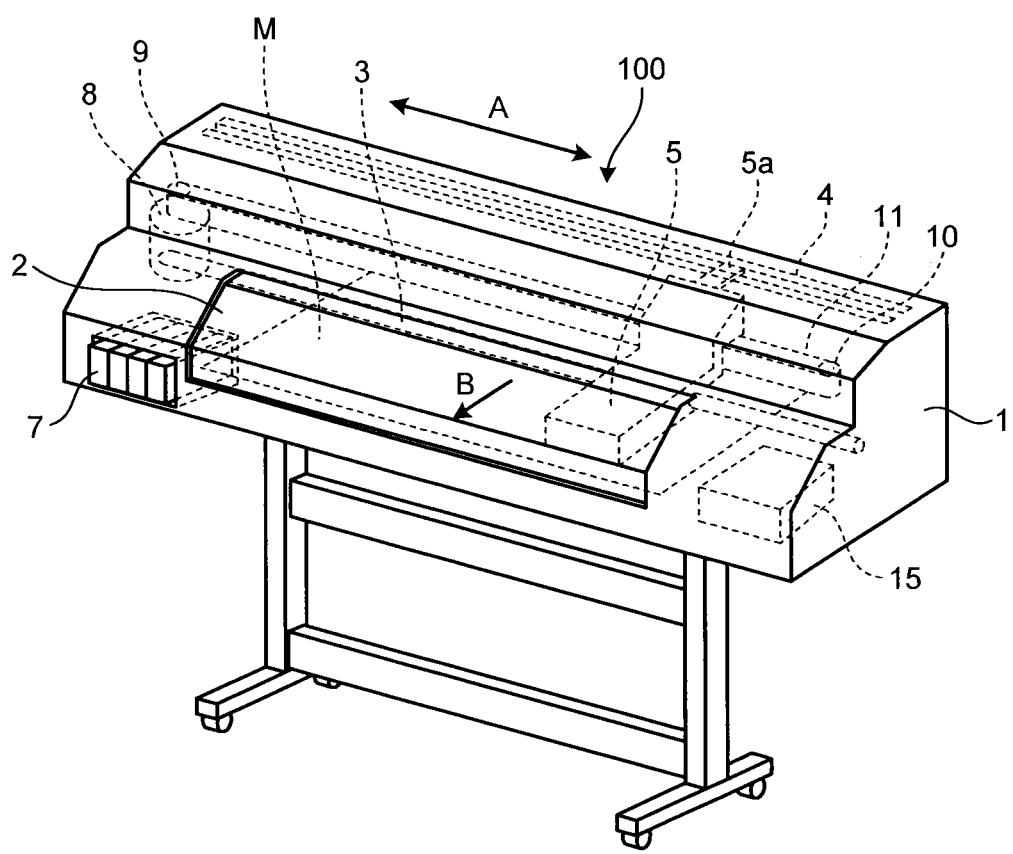
FIG. 1 is a perspective view showing an interior of an image forming apparatus.
Figure 2:
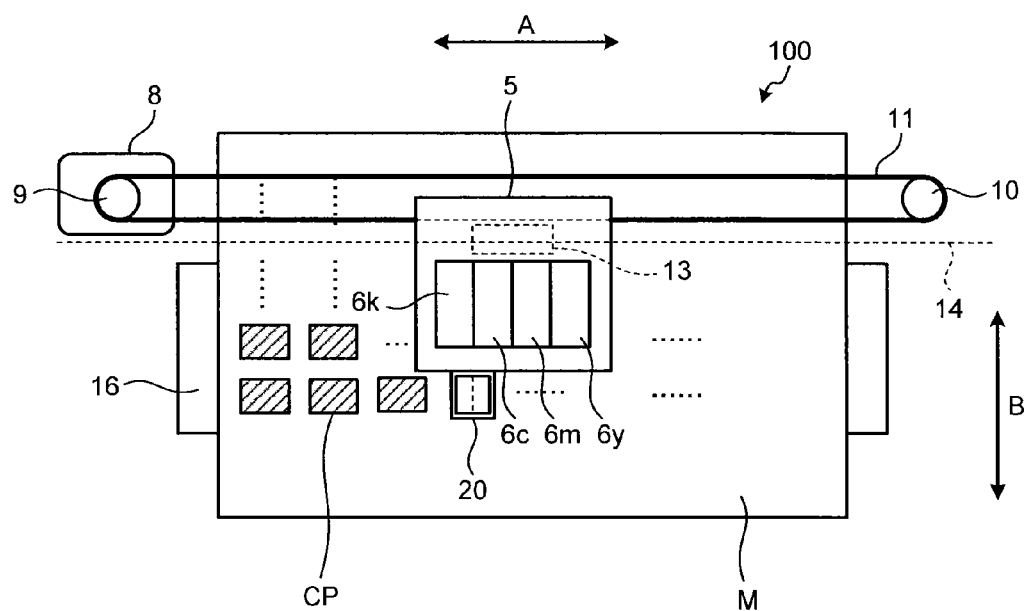
FIG. 2 is a top view showing a mechanical structure of the interior of the image forming apparatus.
Figure 3:
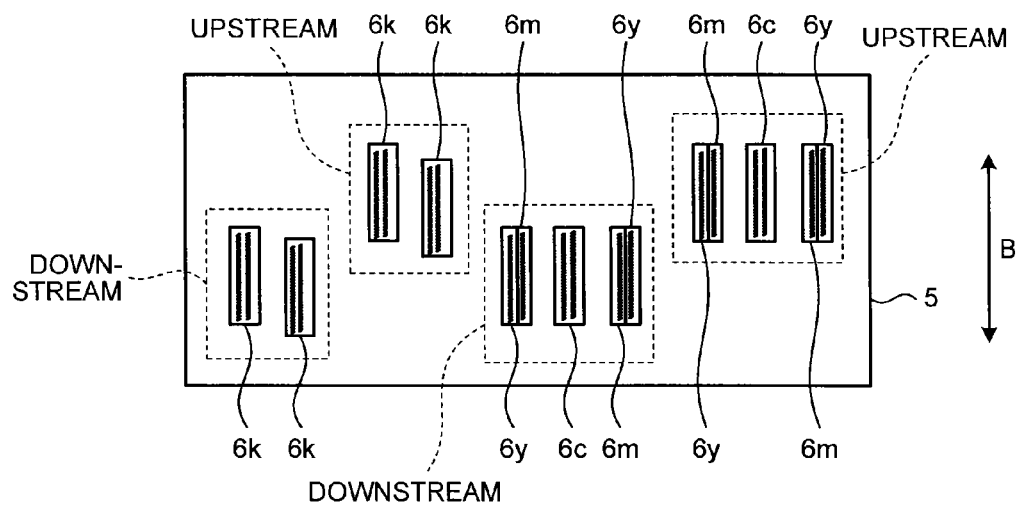
FIG. 3 is a diagram for explaining an arrangement example of recording heads mounted on a carriage.

First, a mechanical structure of an image forming apparatus 100 of the embodiment is explained, referring to FIG. 1 to FIG. 3. FIG. 1 is a perspective view showing an interior of the image forming apparatus 100, FIG. 2 is a top view showing a mechanical structure of the interior of the image forming apparatus 100, and FIG. 3 is a diagram for explaining an arrangement example of a recording heads 6 mounted on a carriage 5.

As depicted in FIG. 1, the image forming apparatus 100 of the present embodiment includes the carriage (supporting member) 5 that moves back and forth in a main scanning direction (direction of an arrow A in the figure). The carriage 5 is supported by a main guide rod 3 that extends along the main scanning direction. Moreover, a joint member 5a is provided in the carriage 5. The joint member 5a is engaged with a sub guide member 4 that is provided in parallel to the main guide rod 3, to stabilize the position of the carriage 5.

On the carriage 5, as depicted in FIG. 2, four recording heads 6y, 6m, 6c, and 6k (one example of an image recording unit) are mounted. The recording head 6y is a recording head that ejects yellow (Y) ink. The recording head 6m is a recording head that ejects magenta (M) ink. The recording head 6c is a recording head that ejects cyan (C) ink. The recording head 6k is multiple recording heads that eject black (Bk) ink. Hereinafter, when referring to these recording heads 6y, 6m, 6c, and 6k collectively, it is referred to as the recording head 6. The recording head 6 is supported by the carriage 5 such that an ejection surface (nozzle surface) faces downward (side of a recording medium M).

A cartridge 7 that is an ink supplying member to supply ink to the recording head 6 is not mounted on the carriage 5, but is arranged at a predetermined position in the image forming apparatus 100. The cartridge 7 and the recording head 6 are connected through a pipe, and ink is supplied to the recording head 6 from the cartridge 7 through this pipe.

The carriage 5 is connected to a timing belt that is stretched between a driving pulley 9 and a driven pulley 10. The driving pulley 9 is rotated by a driving force of a main scanning motor 8. The driven pulley 10 has mechanism to adjust a distance from the driving pulley 9, and has a role of giving predetermined tension to the timing belt 11. The carriage 5 moves back and forth in the main scanning direction by an action of the timing belt 11 being carried by the driving force of the main scanning motor 8. Movement of the carriage 5 in the main scanning direction is controlled based on an encoder value that is obtained by detecting a mark of an encoder sheet 14 by an encoder sensor 13 arranged in the carriage 5.

Furthermore, the image forming apparatus 100 of the present embodiment includes a maintenance mechanism 15 to maintain the reliability of the recording head 6. The maintenance mechanism 15 performs cleaning and capping of an ejection surface, ejection of unnecessary ink from the recording head 6, and the like.

At a position opposed to the ejection surface of the recording head 6, as depicted in FIG. 2, a platen 16 is provided. The platen 16 is to support the recording medium M at the time of ejecting ink onto the recording medium M from the recording head 6. The image forming apparatus 100 of the present embodiment is a wide machine in which a moving distance of the carriage 5 in the main scanning direction is long. Therefore, the platen 16 is formed by connecting multiple plate-formed members in the main scanning direction (moving direction of the carriage 5). The recording medium M is sandwiched by conveying rollers that are driven by a sub-scanning motor 12 (refer to FIG. 11) described later, and is conveyed intermittently over the platen 16 in a sub-scanning direction.

The recording head 6 includes multiple nozzle lines, and records an image on the recording medium M by ejecting ink from the nozzle lines onto the recording medium M that is conveyed over the platen 16. In the present embodiment, to increase width of an image to be printed by a single scanning of the carriage 5, the upstream recording head 6 and the downstream recording head 6 are mounted on the carriage 5 as depicted in FIG. 3. Moreover, twice as many units of the recording head 6k that ejects black ink are mounted on the carriage 5 as the recording heads 6y, 6m, and 6c. This is to equalize the overlapping order of colors in the back and forth action of the carriage 5, and not to make a color differ in back and forth ways. Note that the arrangement of the recording head 6 in FIG. 3 is one example, and is not limited to the arrangement shown in FIG. 3.

The respective components described above constituting the image forming apparatus 100 of the present embodiment are arranged inside an exterior member 1. To the exterior member 1, a cover member 2 is arranged in an openable and closable manner. At maintenance of the image forming apparatus 100 or when a jam occurs, by opening the cover member 2, work for the respective components provided inside the image forming apparatus 100 can be done.

The image forming apparatus 100 of the present embodiment intermittently conveys the recording medium M in the sub-scanning direction (direction of an arrow B in the figure), and ejects ink on the recording medium M positioned on the platen 16 from the nozzle line of the recording head 6 that is mounted on the carriage 5 while moving the carriage 5 in the main scanning direction, while the conveyance of the recording medium M in the sub-scanning direction is stopped, to record an image on the recording medium M.

Particularly, when calibration such as color adjustment of the image forming apparatus 100 is performed, ink is ejected on the recording medium M on the platen 16 from the nozzle line of the recording head 6 that is mounted on the carriage 5, to record a test pattern in which multiple patches are aligned on the recording medium M. To each patch included in this test pattern, colorimetry is performed. Each patch included in the test pattern is an image that is obtained by printing a reference color by actually using ink by the image forming apparatus 100, and reflects characteristics specific to the image forming apparatus 100. Therefore, by using a colorimetry value of these patches, a device profile describing the characteristics specific to the image forming apparatus 100 can be created or corrected. By performing color conversion between a standard color space and a device dependent color based on this device profile, the image forming apparatus 100 can output an image with high reproducibility.

The image forming apparatus 100 of the present embodiment has a colorimetric camera (imaging device) 20 to perform colorimetry on each patch included in the test pattern that is recorded on the recording medium M. The colorimetric camera 20 is supported by the carriage 5 on which the recording head 6 is mounted as depicted in FIG. 2. The colorimetric camera 20 moves over the recording medium M on which the test pattern is recorded by conveyance of the recording medium M and movement of the carriage 5, and performs imaging of the image when reaching a position opposed to each patch. Based on an RGB value of a patch acquired by imaging, a colorimetry value of the patch is calculated. Although an example in which color adjustment of the image forming apparatus 100 is performed by using a colorimetry value of a patch acquired by imaging is explained in the present embodiment, color adjustment of the image forming apparatus 100 can be performed by using an RGB value of a patch acquired by imaging. In this case, an amount of ink to be ejected on the recording medium M is adjusted by the color adjustment.

Mechanical Structure of Colorimetric Camera

Figure 4:
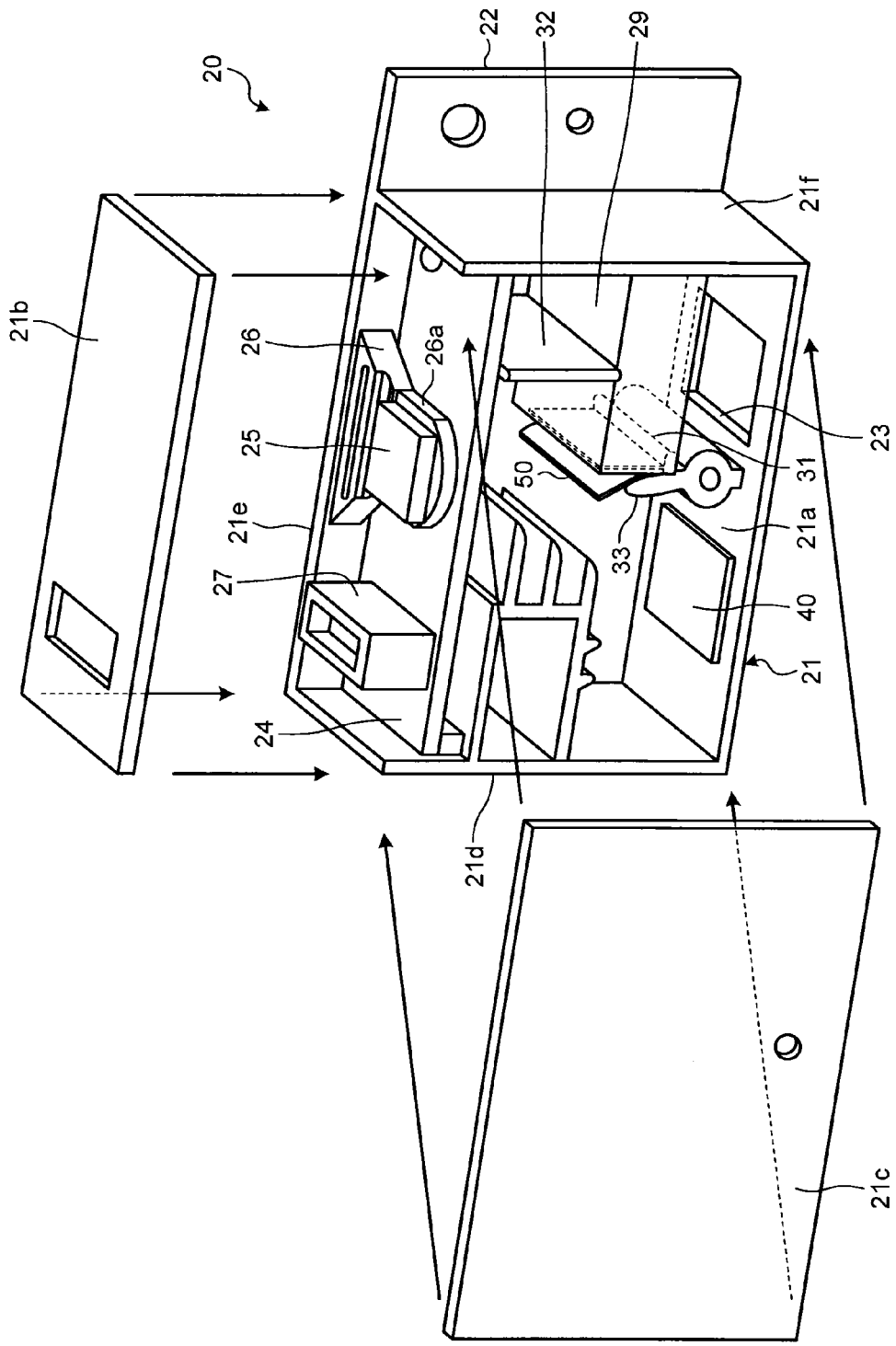
FIG. 4 is an exploded perspective view of a colorimetric camera.
Figure 5:
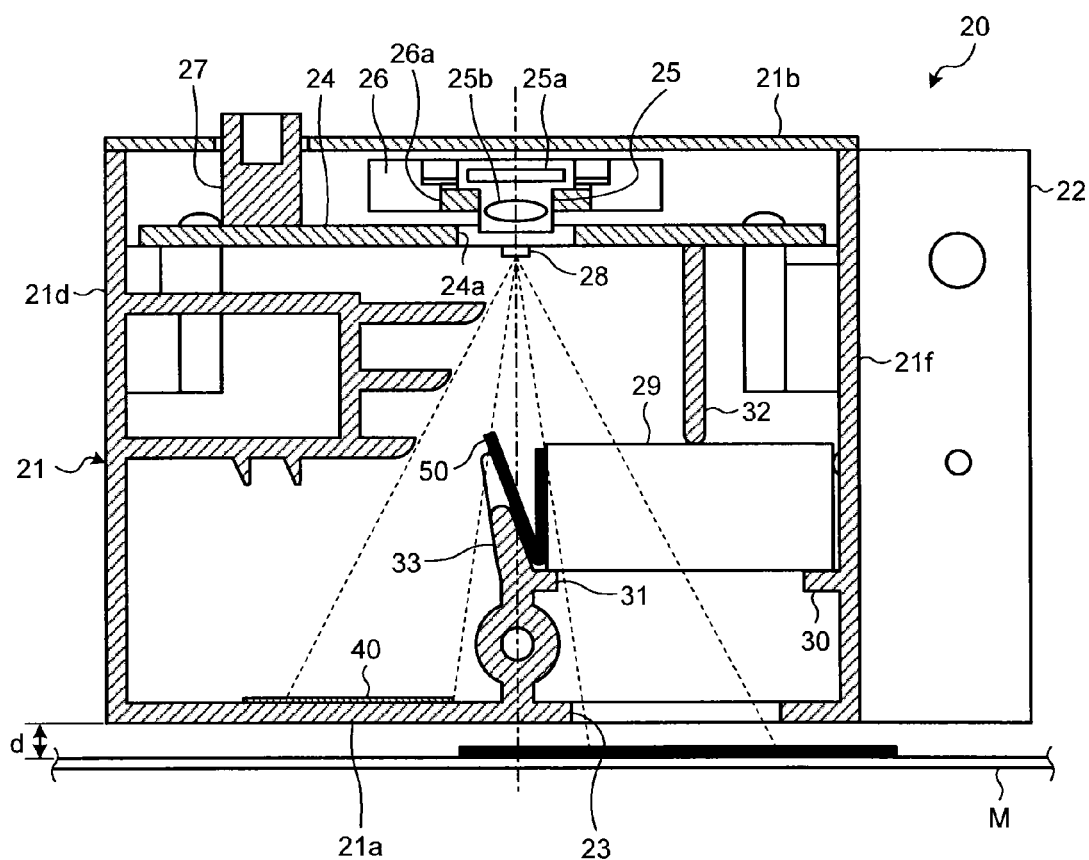
FIG. 5 is a vertical cross-section of the colorimetric camera.
Figure 6:
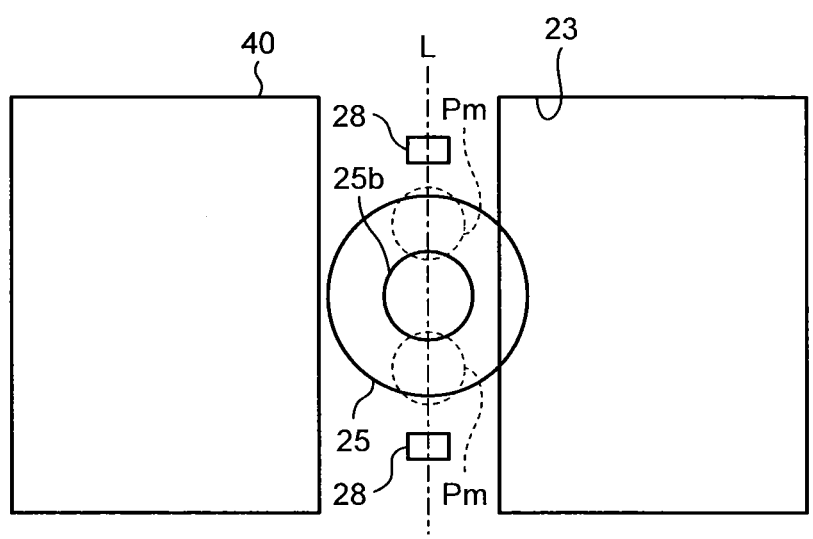
FIG. 6 is a diagram for explaining a part layout inside the colorimetric camera.

Next, a mechanical structure example of the colorimetric camera 20 of the present embodiment is explained, referring to FIG. 4 to FIG. 6. FIG. 4 is an exploded perspective view of the colorimetric camera 20, FIG. 5 is a vertical cross-section of the colorimetric camera 20, and FIG. 6 is a diagram for explaining a part layout inside the colorimetric camera 20.

The colorimetric camera 20 has a casing 21 in which an attachment member 22 is integrally formed as depicted in FIG. 4 and FIG. 5. The casing 21 includes, for example, a bottom plate 21a and a top plate 21b, and side wall portions 21c, 21d, 21e, and 21f that connect these bottom plate 21a and top plate 21b. The bottom plate 21a and the side wall portions 21d, 21e, and 21f are formed integrally with the attachment member 22, for example, by molding. On the other hand, the top plate 21b and the side wall portion 21c are detachably structured. FIG. 4 depicts a state in which the top plate 21b and the side wall portion 21c are removed.

The colorimetric camera 20 is attached to the carriage 5 by being fastened with a fastening member such as a screw onto a side surface of the carriage 5 in such a manner that the side wall portion 21e and the attachment member 22 of the casing 21 are abutted on the side surface of the carriage 5. At this time, the colorimetric camera 20 is attached to the carriage 5 such that the bottom plate 21a of the casing 21 oppose to the recording medium M on the platen 16 in substantially parallel thereto through a predetermined gap d.

To the bottom plate 21a of the casing 21 that opposes to the recording medium M on the platen 16, an opening portion 23 to enable imaging of a patch (subject) of the test pattern formed on the recording medium from an inside of the casing 21 is arranged. Moreover, on an inside surface of the bottom plate 21a of the casing 21, a reference chart 40 is arranged so as to be adjacent to the opening portion 23 through a supporting member 33. The reference chart 40 is imaged by a sensor unit 25 described later at the time of performing colorimetry of a patch included in the test pattern or acquiring an RGB value, together with the patch. Details of the reference chart 40 are described later.

On the other hand, inside the casing 21 and near the top plate 21b, a circuit board 24 is arranged. Furthermore, between the top plate 21b of the casing 21 and the circuit board 24, the sensor unit 25 (sensor unit) that images an image is arranged. The sensor unit 25 has a two-dimensional image sensor 25a, such as charge coupled device (CCD) and a complementary metal oxide semiconductor (CMOS) sensor, and an imaging forming lens 25b that forms an optical image on a light reception surface (imaging region) of the two-dimensional image sensor 25a in a imaging range of the sensor unit 25, as depicted in FIG. 5.

The sensor unit 25 is held by a sensor holder 26 that is integrally formed, for example, with the side wall portion 21e of the casing 21. In the sensor holder 26, a ring portion 26a is arranged at a position opposing to a through hole 24a that is formed in the circuit board 24. The ring portion 26a has a through hole in a size suitable for an external shape of an extruding portion of the sensor unit 25 near the imaging forming lens 25b. The sensor unit 25 is held by the sensor holder 26 by inserting the extruding portion near the imaging forming lens 25b in the ring portion 26a of the sensor holder 26, in such a manner that the imaging forming lens 25b faces toward the bottom plate 21a of the casing 21 through the through hole 24a of the circuit board 24.

At this time, the sensor unit 25 is held by the sensor holder 26 in a state of being positioned by the sensor holder 26 such that an optical axis indicated by alternate long and short dashed lines in FIG. 5 is substantially perpendicular to the bottom plate 21a of the casing 21, and the opening portion 23 and the reference chart 40 described later are included in the imaging range. Thus, the sensor unit 25 can image a patch (subject) outside the casing 21 through the opening portion 23 with a part of the imaging range of the two-dimensional image sensor 25a, while imaging the reference chart 40 with another part of the imaging region of the two-dimensional image sensor 25a.

The sensor unit 25 is electrically connected to the circuit board 24 on which various kinds of electronic parts are mounted, for example, through a flexible cable. Moreover, to the circuit board 24, an external connection connector 27 to which a connecting cable to connect the colorimetric camera 20 to a main control board 120 (refer to FIG. 11), described later, of the image forming apparatus 100 is arranged.

Moreover, inside the casing 21, an illumination light source 28 that illuminates at least the imaging range of the sensor unit 25 is provided. AS the illumination light source 28, for example, a light emitting diode (LED) is used. In the present embodiment, two LEDs are used as the illumination light source 28 as depicted in FIG. 6. FIG. 6 shows positional relation of the sensor unit 25, the illumination light source 28, the opening portion 23, and the reference chart 40 when the inside of the colorimetric camera 20 is viewed downward in a vertical direction (along the optical axis direction) from the circuit board 24 toward the bottom plate 21a of the casing 21.

The two LEDs used as the illumination light source 28 are mounted on a surface of the circuit board 24 closer to the bottom plate 21a. However, the illumination light source 28 is only required to be arranged at a position that enables to illuminate the imaging range of the sensor unit 25 substantially uniformly with diffused light, and it is not necessarily required to be mounted directly on the circuit board 24. Furthermore, although LEDs are used as the illumination light source 28 in the present embodiment, a type of a light source is not limited to an LED. For example, an organic electroluminescence (EL) or the like may be used as the illumination light source 28. When an organic EL is used as the illumination light source 28, illumination light having spectral distribution close to that of a sunbeam, and therefore, improvement of colorimetry accuracy can be expected.

In the present embodiment, as depicted in FIG. 6, the two LEDs are arranged such that a projection position on the bottom plate 21a when the two LEDs used as the illumination light source 28 are viewed downward in a vertical direction from the circuit board 24 toward the bottom plate 21a of the casing 21 is positioned within a region between the opening portion 23 and the reference chart 40, and are arranged to be positioned symmetrically about the sensor unit 25. In other words, the two LEDs used as the illumination light source 28 are arranged such that a line L that connects the two LEDs used as the illumination light source 28 passes through the center of the image forming lens 26b of the sensor unit 26, and the opening portion 23 is positioned on one side and the reference chart 40 is positioned on the other side with respect to the line L connecting the two LEDs as the boundary. By thus arranging the two LEDs used as the illumination light source 28, a patch to be a subject outside the casing 21 and the reference chart 40 arranged inside the casing 21 can be illuminated under substantially the same condition.

To illuminate a patch outside the casing 21 under substantially the same illumination condition as the reference chart 40 arranged inside the casing 21, it is necessary to keep the patch outside the casing 21 not to be exposed to light from outside, and to illuminate the patch only with the illumination light from the illumination light source 28. To keep the patch outside the casing 21 not to be exposed to light from outside, it is effective to decrease the gap d between the bottom plate 21a of the casing 21 and the recording medium M so that light from outside toward the patch is shut by the casing 21. However, if the gap d between the bottom plane 21a of the casing 21 and the recording medium M is too small, the recording medium M can touch the bottom plate 21a of the casing 21, and appropriate imaging might not be able to be performed. Therefore, it is desirable that the gap d between the bottom plate 21a of the casing 21 and the recording medium M be set to a small value within a range in which the recording medium M does not contact the bottom plate 21a of the casing 21, considering flatness of the recording medium M. For example, if the gap d between the bottom plane 21a of the casing 21 and the recording medium M is set to about 1 millimeters (mm) to 2 mm, it is possible to prevent the patch on the recording medium M from being exposed to light from outside effectively, keeping the recording medium M from contact with the bottom plate 21a of the casing 21.

Moreover, inside the casing 21, an optical-path-length changing member 29 is arranged in an optical path between the sensor unit 25 and a patch (subject) outside the casing 21 that is imaged by the sensor unit 25 through the opening portion 23. The optical-path-length changing member 29 is an optical device with a refractive index n having sufficient transmittance to light (illumination light) from the illumination light source 28. The optical-path-length changing member 29 has a function of bringing an image forming plane of an optical image of the subject outside the casing 21 close to an image forming plane of an optical image of the reference chart 40 inside the casing 21. That is, in the colorimetric camera 20 of the present embodiment, an optical path length is changed by arranging the optical-path-length changing member 29 in an optical path between the sensor unit 25 and a subject outside the casing 21, thereby bringing the image forming plane of the optical image of the patch to be a subject outside the casing 21 and the image forming plane of the reference chart 40 inside the casing 21 together onto the light reception surface of the two-dimensional image sensor 25a of the sensor unit 25. Thus, the sensor unit 25 can image an image focused on both the patch outside the casing 21 and the reference chart 40 inside the casing 21.

The optical-path-length changing member 29 is supported by a pair of ribs 30, 31 at both ends of a surface of the optical-path-length changing member 29 closer to the bottom plane 21a, for example, as depicted in FIG. 4 and FIG. 5. Furthermore, with a pressing member 32 arranged between a surface of the optical-path-length changing member 29 closer to the top plate 21b and the circuit board 24, the optical-path-length changing member 29 is stabilized inside the casing 21. Being arranged so as to close the opening portion 23 arranged in the bottom plate 21a of the casing 21, the optical-path-length changing member 29 has a function of preventing impurities, such as ink mist and dust, that enter the casing 21 through the opening portion 23 from outside of the casing 21, from adhering to the sensor unit 25, the illumination light source 28, the reference chart 40, and the like also.

Moreover, inside the casing 21, a light absorption member 50 to absorb light from the illumination light source 28 to be specular-reflection light in the imaging range of the sensor unit 25 is arranged. When a position from which specular-reflection light of the illumination light source 28 enters the sensor unit 25, in the imaging range of the sensor unit 25 is a specular-reflection position Pm, the light absorption member 50 is arranged in an optical path Pm from the illumination light source 28 toward the specular-reflection position.

In the colorimetric camera 20 of the present embodiment, the two LEDs used as the illumination light source 28 are arranged in a positional relation relative to the sensor unit 25 depicted in FIG. 6. Therefore, in a region between the opening portion 23 and the reference chart 40, two specular-reflection positions Pm (circles in broken lines in FIG. 6) are present, respectively corresponding to the two LEDs used as the illumination light source 28. The light absorption member 50 is arranged in the optical paths so as to cut off at least an optical path of light toward one of the specular-reflection positions Pm from one of the LEDs used as the illumination light source 28, and an optical path of light toward the other specular-reflection position Pm from the other LED.

Specifically, for example as depicted in FIG. 4 and FIG. 5, the light absorption member 50 is arranged in a gap between a side surface portion of the optical-path-length changing member 29 and the supporting member 33 that is integrally formed with the rib 31 supporting the optical-path-length changing member 29. This position is in the optical path of light toward the specular-reflection position Pm from the illumination light source 28. In the colorimetric camera 20 of the present embodiment, the light absorption member 50 is thus arranged in the optical path of light toward the specular-reflection position from the illumination light source 28, to absorb light toward the toward the specular-reflection position from the illumination light source 28 by the light absorption member 50, thereby preventing specular-reflection light of the illumination light source 28 that is specularly reflected at the direction reflection position Pm from entering the sensor unit 25. Details of the light absorption member 50 are described later.

Note that the mechanical structure of the colorimetric camera 20 explained above is one example, and is not limited to this structure. The colorimetric camera 20 of the present embodiment is only required to have a structure in which light from the illumination light source 28 toward the specular-reflection position Pm is absorbed by the light absorption member 50, and in which an RGB value of a subject can be properly acquired by taking an image that includes the subject by the sensor unit 25, and various alteration and modification can be made. For example, although the reference chart 40 is arranged inside the bottom plate 21a of the casing in the colorimetric camera 20 described above, it may be structured such that an opening separate from the opening portion 23 is provided at a position at which the reference chart 40 is arranged on the bottom plate 21a of the casing 21, and the reference chart 40 is put from outside of the casing 21 at the position at which this opening is provided. In this case, the sensor unit 25 images a patch (subject) of a test pattern that is formed on the recording medium M through the opening portion 23 and images the reference chart 40 that is put onto the bottom plate 21a of the casing 21 from outside. In this example, there is an advantage that the reference chart 40 can be replaced easily when a defect such as stains occurs thereon.

Specific Example of Reference Chart

Figure 7:
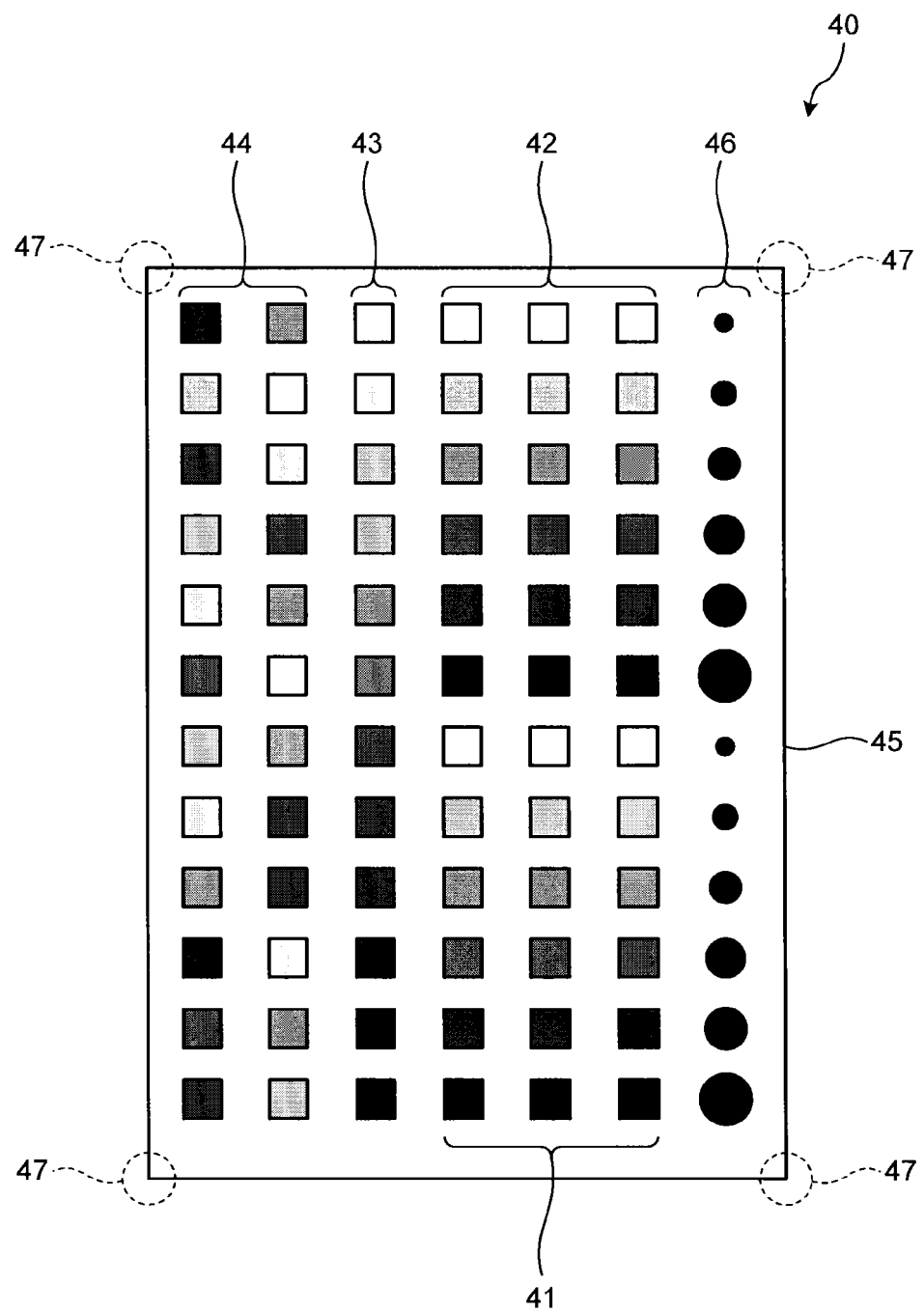
FIG. 7 depicts a specific example of a reference chart.

Next, a specific example of the reference chart 40 that is arranged in the casing 21 of the colorimetric camera 20 is explained, referring to FIG. 7. FIG. 7 depicts a specific example of the reference chart 40.

The reference chart 40 depicted in FIG. 7 has multiple reference patch columns 41 to 44, a dot-diameter-measurement pattern column 46, a distance measurement line 45, and a chart-position identification marker 47.

The reference patch columns 41 to 44 include the reference patch column 41 in which reference patches of primary colors of YMCK are arranged in gradation, the reference patch column 42 in which reference patches of secondary colors of RGB are arranged in gradation, the reference patch column 43 in which reference patches of gray scale are arranged in gradation (achromatic gradation pattern) 43, and the reference patch column 44 in which reference patches of tertiary color are arranged. The dot-diameter-measurement pattern column 46 is a pattern column for geometric shape measurement in which circular pattern in different sizes are arranged in order of size, and can be used for measurement of a dot diameter of an image printed on the recording medium M.

The distance measurement line 45 is formed as a frame of a rectangle that surrounds the reference patch columns 41 to 44 and the dot-diameter-measurement pattern column 46. The chart-position identification marker 47 is arranged at a position of four corners of the distance measurement line 45, and functions as a marker to identify a position of each reference patch. By identifying the distance measurement line at four corners thereof from an image of the reference chart 40 imaged by the sensor unit 25, a position of the reference chart 40 and a position of each reference patch or a pattern can be identified.

Each reference patch constituting the reference patch columns 41 to 44 for measurement is used as a reference of colors in which imaging conditions of the colorimetric camera 20 are reflected. A configuration of the reference patch columns 41 to 44 for colorimetry arranged in the reference chart 40 is not limited to the example depicted in FIG. 7, but arbitrary reference patch column can be applied. For example, a reference patch column enabling to identify a color range as wide as possible can be applied. Furthermore, the reference patch column 41 of primary color of YMCK and the reference patch column 43 of gray scale may be configured with patches for colorimetry values of ink used in the image forming apparatus 100. Moreover, the reference patch column 42 of secondary color of RGB may be configured with patches of colorimetry values that can be reproduced by ink used in the image forming apparatus 100, and further, a reference color chart of Japan Color or the like in which colorimetry values are defined can be used.

Although the reference chart 40 having the reference patch columns 41 to 44 in common patch (color chart) forms is used in the present embodiment, the reference chart 40 is not necessarily required to have a form having the reference patch columns 41 to 44 as above. The reference chart 40 is only required to have a configuration in which multiple colors that can be used for colorimetry are arranged in such a manner that respective positions can be identified.

Because the reference chart 40 is arranged on the inside surface of the bottom plate 21a of the casing 21 such that the reference chart 40 is adjacent to the opening portion 23 as described above, it can be imaged by the sensor unit 25 at the same time with a subject outside the casing 21. Imaging at the same time herein is to acquire one frame image data that includes the subject outside the casing 21 and the reference chart 40. That is, even if there is a time difference in data acquisition per pixel, as long as image data that includes the subject outside the casing 21 and the reference chart 40 is acquired, it is regarded that the subject outside the casing 21 and the reference chart 40 are imaged at the same time.

Specific Example of Light Absorption Member

Figure 8:
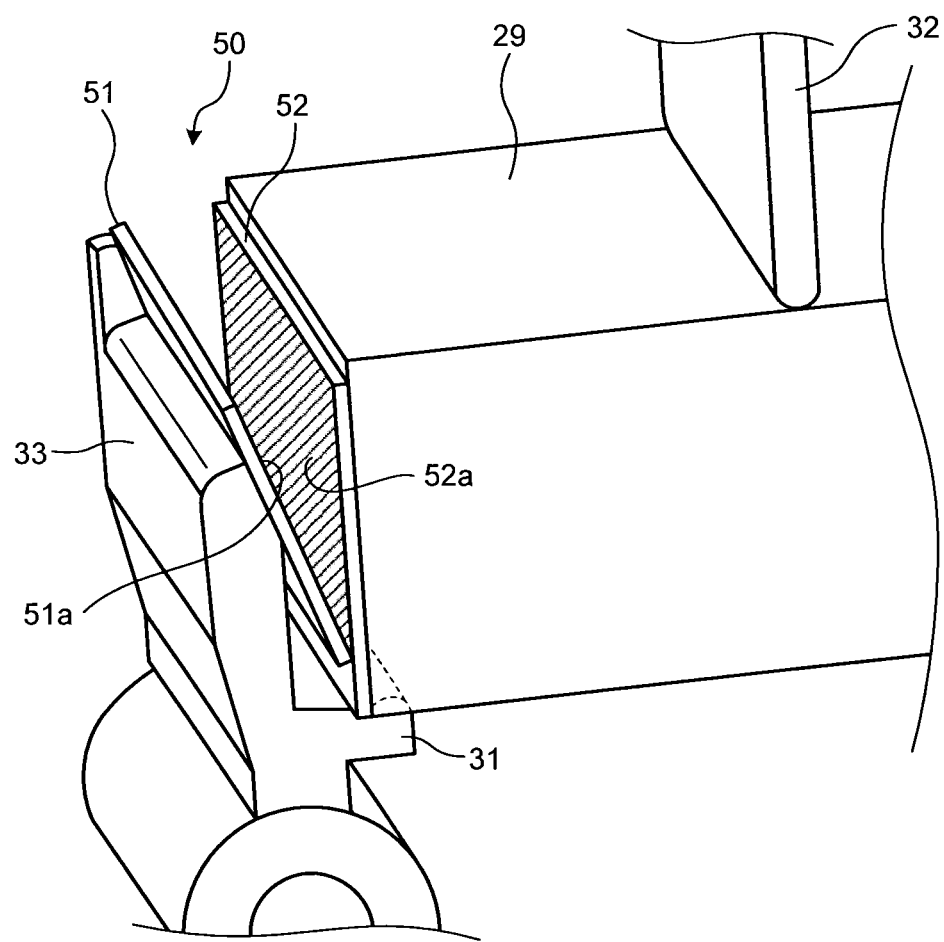
FIG. 8 is a perspective view showing a proximity of a light absorption member in an enlarged manner.
Figure 9:
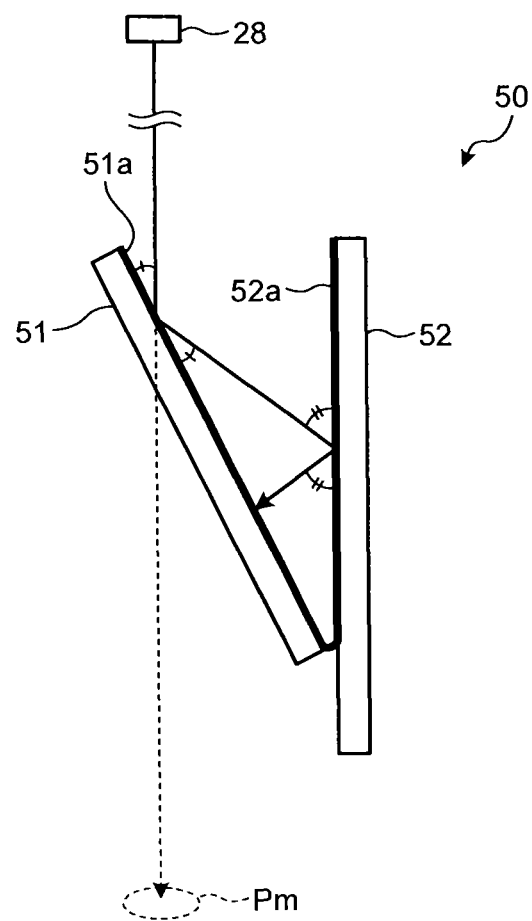
FIG. 9 is a diagram for explaining a function of the light absorption member.
Figure 10:
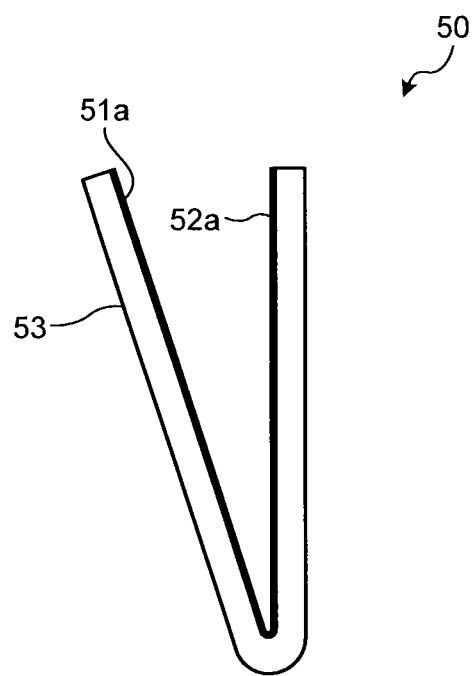
FIG. 10 depicts a configuration example of the light absorption member that is formed by processing a single material.

Next, a specific example of the light absorption member 50 that is arranged inside the casing 21 of the colorimetric camera 20 is explained, referring to FIG. 8 to FIG. 10. FIG. 8 is a perspective view showing a proximity of the light absorption member 50 inside the casing 21 of the colorimetric camera 20 in an enlarged manner, FIG. 9 is a diagram for explaining a function of the light absorption member 50, and FIG. 10 depicts a configuration example of the light absorption member 50 that is formed by processing a single material.

The light absorption member 50 is structured, for example, as depicted in FIG. 8 and FIG. 9, by combining a first member 51 and a second member 52 in a planer shape. The second member 52 is arranged, for example, along a side surface of the optical-path-length changing member 29, and the first member 51 is arranged so as to be inclined relative to the second member 52 by a predetermined angle, supported by the supporting member 33. A surface of the first member 51 closer to the second member 52 is referred to as a first surface 51a on which light from the illumination light source 28 toward the specular-reflection position Pm is irradiated, and a surface of the second member 52 closer to the first member 51 is referred to as a second surface 52a that faces to the first surface 51a. That is, the light absorption member 50 includes the first member 51 having the first surface 51a, and the second member 52 having the second surface 52a, and the first member 51 and the second member 52 are arranged in such a manner that the first surface 51a and the second surface 52a face to each other. At this time, the first surface 51a and the second surface 52a are arranged such that a distance therebetween decreases as distance from the illumination light source 28 increases, and contact with each other at a position farthest from the illumination light source 28. A gap between the first surface 51a and the second surface 52a at a position closest to the illumination light source 28 is set to be larger than a diameter of a spot of light from the illumination light source 28 toward the specular-reflection position Pm, according to a size of the illumination light source 28 and a distance from the illumination light source 28.

The first member 51 and the second member 52 can be formed with an arbitrary material. However, it is preferable that the first surface 51a of the first member 51 and the second surface 52a of the second member 52 have a structure apt to absorb light, for example, by coloring in black.

In the light absorption member 50 structured as above, the inclination angle of the first member 51 relative to the second member 52 is determined so that reflected light that has been reflected on the first surface 51a and then reflected on the second surface 52a is further directed toward the first surface 51a, as depicted in FIG. 9. By thus structuring the light absorption member 50, even if intense light from the illumination light source 28 toward the specular-reflection position Pm is not absorbed entirely by the light absorption member 50 and some enters the sensor unit 25, the light is to enter the sensor unit 25 after reflected on the light absorption member 50 at least three times. Therefore, a light amount of light entering the sensor unit 25 is significantly attenuated through at least three times of reflection on the light absorption member 50, and a signal of a region in which reflected light from the light absorption member 50 forms an image is not to be close to a saturation level in an image that is imaged by the sensor unit 25.

Although it is structured such that the first surface 51a and the second surface 52a contact with each other at the position furthest from the illumination light source 28 in the example of the light absorption member 50 depicted in FIG. 8 and FIG. 9, the first surface 51a and the second surface 52a are not necessarily required to contact with each other. For example, it may be structured such that a third surface connects the first surface 51a and the second surface 52a that are apart from each other at a position furthest from the illumination light source 28. However, higher light absorption effect can be obtained with the structure in which the first surface 51a and the second surface 52a contact with each other at the position furthest from the illumination light source 28.

Moreover, although the light absorption member 50 depicted in FIG. 8 and FIG. 9 is structured by combining the first member 51 having the first surface 51a and the second member 52 having the second surface 52a, it may be one formed by processing a single material 53 as depicted in FIG. 1. For example, two surfaces facing to each other may be formed by folding the single material 53 at a predetermined angle, and one may be the first surface 51a and the other may be the second surface 52a.

Outline of Configuration of Control Mechanism of Image Forming Apparatus

Figure 11:
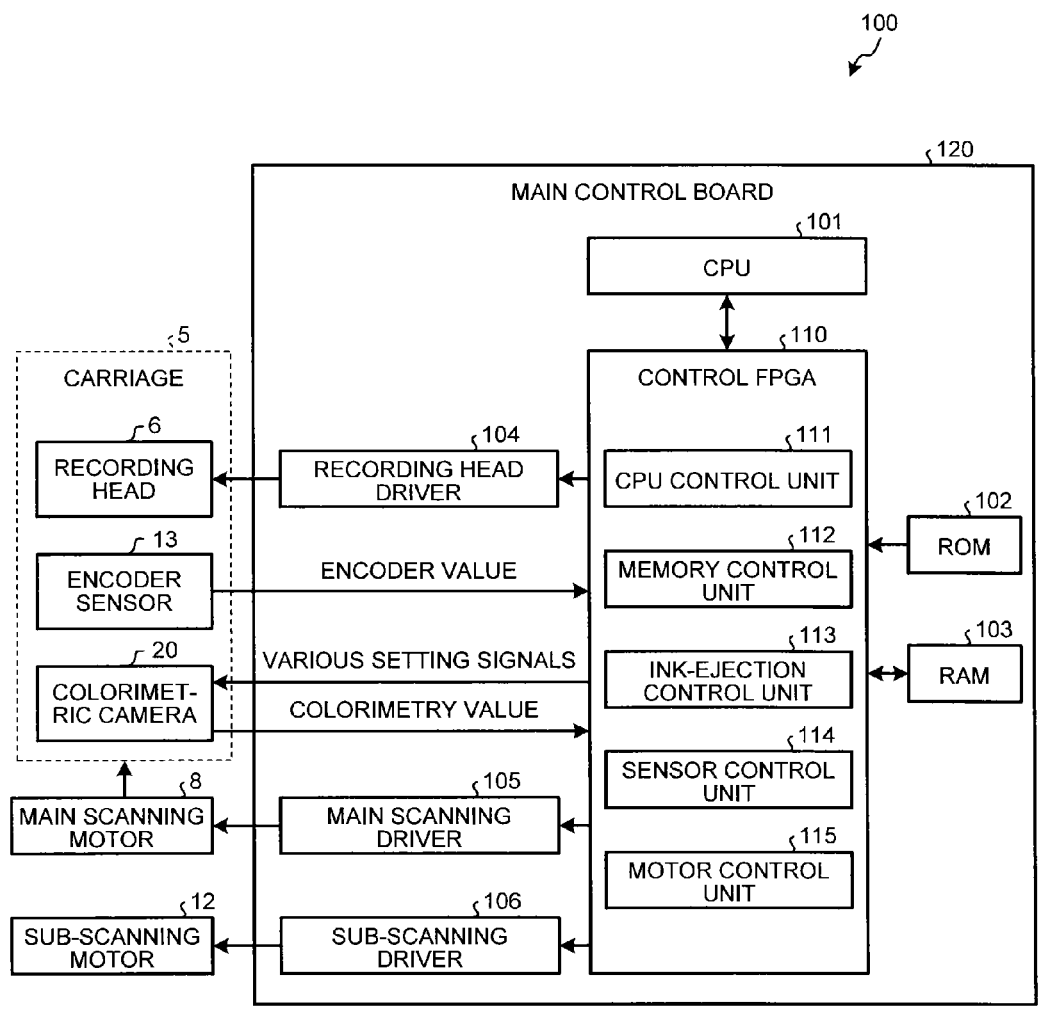
FIG. 11 is a block diagram showing a configuration example of a control mechanism of the image forming apparatus.

Next, an outline of a configuration of a control mechanism of the image forming apparatus 100 of the present embodiment is explained, referring to FIG. 11. FIG. 11 is a block diagram showing a configuration example of the control mechanism of the image forming apparatus 100.

The image forming apparatus 100 of the present embodiment includes a central processing unit (CPU) 101, a read only memory (ROM) 102, a random access memory (RAM) 103, a recording head driver 104, a main scanning driver 105, a sub-scanning driver 106, a control field-programmable gate array (FPGA) 110, the recording head 6, the colorimetric camera 20, the encoder sensor 13, the main scanning motor 8, and the sub-scanning motor 12 as depicted in FIG. 11. The CPU 101, the ROM 102, the RAM 103, the recording head driver 104, the main scanning driver 105, the sub-scanning driver 106, and the control FPGA 110 are mounted on the main control board 120. The recording head 6, the encoder sensor 13, and the colorimetric camera 20 are mounted on the carriage 5 as described above.

The CPU 101 controls the entire image forming apparatus 100. For example, the CPU 101 uses the RAM 103 as a working area, to execute various kinds of control programs stored in the ROM 102, and to output a control command to control various kinds of operations in the image forming apparatus 100.

The recording head driver 104, the main scanning driver 105, the sub-scanning driver 106 are drivers to drive the recording head 6, the main scanning motor 8, and the sub-scanning motor 12, respectively.

The control FPGA 110 controls various kinds of operations in the image forming apparatus 100 in association with the CPU 101. The control FPGA 110 includes, for example, a CPU control unit 111, a memory control unit 112, an ink-ejection control unit 113, a sensor control unit 114, and a motor control unit 115, as functional components.

The CPU control unit 111 communicates with the CPU 101, and transfers various kinds of information acquired by the control FPGA 110 to the CPU 101, and receives a control command that is output by the CPU 101.

The memory control unit 112 performs memory control for the CPU 101 to access to the ROM 102 and the RAM 103.

The ink-ejection control unit 113 controls an action of the recording head driver 104 according to a control command from the CPU 101, thereby controlling ink ejection timing from the recording head 6 that is driven by the recording head driver 104.

The sensor control unit 114 performs processing on a sensor signal such as an encoder value output from the encoder sensor 13.

The motor control unit 115 controls an action of the main scanning driver 105 according to a control command from the CPU 101, thereby controlling the main scanning motor 8 driven by the main scanning driver 105, to control movement of the carriage 5 to the main scanning direction. Moreover, the motor control unit 115 controls an action of the sub-scanning driver 106 according to a control command from the CPU 101, thereby controlling the sub-scanning motor 12 that is driven by the sub-scanning driver 106, to control movement of the recording medium M on the platen 16 to the sub-scanning direction.

Each of the components described above are one example of a control function implemented by the control FPGA 110, it may be configured to implement various control functions other than these by the control FPGA 110. Furthermore, it may be configured such that all or a part of the control functions described above is implemented by a program executed by the CPU 101 or another general-purpose CPU. Moreover, it may be configured such that a part of the control functions described above is implemented by dedicated hardware such as an FPGA other than the control FPGA 110 and an application specific integrated circuit (ASIC).

The recording head 6 is driven by the recording head driver 104 an action of which is controlled by the CPU 101 and the control FPGA 110, and ejects ink on the recording medium M on the platen 16 to form an image.

The encoder sensor 13 outputs an encoder value that is obtained by detecting a mark on the encoder sheet 14, to the control FPGA 110. This encoder value is transmitted from the control FPGA 110 to the CPU 101, and is used, for example, for calculating a position and a speed of the carriage 5. The CPU 101 generates a control command to control the main scanning motor 8 based on the position and the speed of the carriage 5 calculated from this encoder value and outputs the control command.

The colorimetric camera 20 images a patch of the test pattern formed on the recording medium M together with the reference chart 40 by the sensor unit 25 at the time of performing color adjustment of the image forming apparatus 100, and calculates a colorimetry value (a color specification value in a standard color space, and for example, an L*a*b* value in an L*a*b* color space) of the patch based on an RGB value of the patch acquired from the captured image and an RGB value of each reference patch of the reference chart 40. The colorimetry value of the patch of the test pattern calculated by the colorimetric camera 20 is transmitted to the CPU 101 through the control FPGA 110. As a specific method of calculating a colorimetry value of a patch, for example, a method disclosed in Japanese Laid-open Patent Publication No. 2013-051671 can be used.

The color adjustment of the image forming apparatus 100 can be performed also by using an RGB value of a patch obtained by imaging, as described above. In this case, the colorimetric camera 20 images each patch included in a test pattern together with the reference chart 40 by the sensor unit 25, and performs processing to correct an error caused by fluctuation in the illumination light source 28 on an RGB value of the patch obtained from the imaged image by using an RGB value of each reference patch of the reference chart 40. The corrected RGB value of the patch is transmitted, for example, from the colorimetric camera 20 to the CPU 101 through the control FPGA 110. Thereafter, the CPU 101 adjusts a parameter and the like to control an ink ejection amount of the recording head 6 using this RGB value, thereby adjusting an amount of ink to be ejected on the recording medium M from the recording head 6.

Configuration of Control Mechanism of Colorimetric Camera

Figure 12:
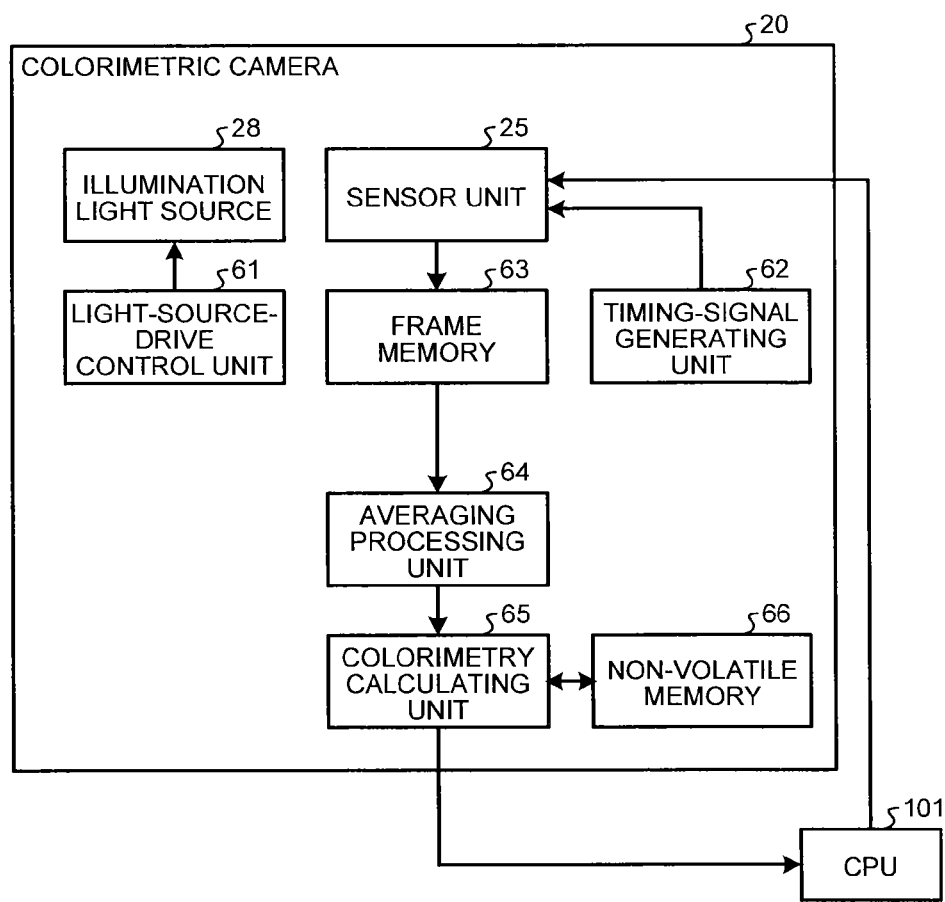
FIG. 12 is a block diagram showing a configuration example of a control mechanism of the colorimetric camera.

Next, an outline of a configuration of a control mechanism of the colorimetric camera 20 is explained, referring to FIG. 12. FIG. 12 is a block diagram showing a configuration example of the control mechanism of the colorimetric camera 20.

The colorimetric camera 20 includes, in addition to the sensor unit 25 and the illumination light source 28 described above, a light-source-drive control unit 61, a timing-signal generating unit 62, a frame memory 63, an averaging processing unit 64, a colorimetry calculating unit 65, and a non-volatile memory 66. The respective components are mounted, for example, on the circuit board 24 arranged inside the casing 21 of the colorimetric camera 20.

The sensor unit 25 converts light entering through the imaging forming lens 25b into an electric signal by the two-dimensional image sensor 25a, and outputs image data of an imaging range illuminated by the illumination light source 28. The sensor unit 25 has a function of analog/digital (AD) converting an analog signal that is obtained by photoelectric conversion by the two-dimensional image sensor 25a into digital image data, and of outputting the image data after performing various kinds of image processing, such as shading correction, white balance correction, γ correction, and format conversion of image data. Settings of various kinds of actions of the two-dimensional image sensor 25a are performed according to various kinds of setting signals from the CPU 101. Note that a part of all of the various kinds of image processing on image data may be performed outside the sensor unit 25.

The light-source-drive control unit 61 generates a light-source driving signal to turn on the illumination light source 28 at the time of imaging an image by the sensor unit 25, to supply to the illumination light source 28.

The timing-signal generating unit 62 generates a timing signal to control imaging start timing of the sensor unit 25, to supply to the sensor unit 25.

The frame memory 63 temporarily stores an image that is output from the sensor unit 25.

The averaging processing unit 64 extracts a region in which a patch of a colorimetry subject is reflected and a region in which each reference patch of the reference chart 40 is reflected from an image that is output by the sensor unit 25 and temporarily stored in the frame memory 63. The averaging processing unit 64 then averages the image data of the region of the patch of a colorimetry subject, and outputs an obtained value to the colorimetry calculating unit 65 as an RGB value of the patch, and averages image data of each reference patch of the reference chart 40, and outputs an obtained value to the colorimetry calculating unit 65 as an RGB value of each reference patch.

The colorimetry calculating unit 65 calculates a colorimetry value of the patch based on the RGB value of the patch of a colorimetry subject obtained by processing performed by the averaging processing unit 64, and on the RGB value of each reference patch of the reference chart 40. The colorimetry value of the patch calculated by the colorimetry calculating unit 65 is transmitted to the CPU 101 on the main control board 120. Because the colorimetry calculating unit 65 can calculate a colorimetry value of a patch by a method disclosed in Japanese Laid-open Patent Publication No. 2013-051671, detailed explanation of the processing of the colorimetry calculating unit 65 is omitted herein.

The non-volatile memory 66 stores various kinds of data necessary for calculating a colorimetry value of a patch by the colorimetry calculating unit 65.

Effect of Embodiment

As explained in detail with specific examples, the colorimetric camera 20 of the present embodiment includes the light absorption member 50 that is arranged in the optical path of light from the illumination light source 28 toward the specular-reflection position Pm. This light absorption member 50 has at least the first surface 51a on which light from the illumination light source 28 toward the specular-reflection position Pm is irradiated and the second surface 52a that faces to the first surface 51a, and is configured such that reflected light that has been reflected on the first surface 51a and then on the second surface 52a is further directed toward the first surface 51a. Therefore, according to the colorimetric camera 20 of the present embodiment, intense light from the illumination light source 28 toward the specular-reflection position Pm is sufficiently absorbed by the light absorption member 50, thereby enabling to suppress a light amount of reflected light from the light absorption member 50 entering the sensor unit 25. Accordingly, in an image imaged by the sensor unit 25, a signal of a region in which the reflected light from the light absorption member 50 forms an image is not to be close to a saturation level, and an RGB value that is used for colorimetry of a patch or color adjustment of the image forming apparatus 100 can be properly obtained from an image that is imaged by the sensor unit 25.

Furthermore, the color adjustment to adjust an ejection amount of ink to be ejected on the recording medium M from the recording head 6 is performed by using a colorimetry value of a patch or an RGB value of the patch calculated by the colorimetric camera 20 of the present embodiment in the image forming apparatus 100 of the present embodiment, it is possible to perform appropriate color adjustment and to record an image with high reproducibility.

Second Embodiment

Next, a second embodiment is explained. The present embodiment indicates a modification of the light absorption member 50 that is included in the colorimetric camera 20. Hereinafter, the light absorption member 50 of the present embodiment is referred to as a light absorption member 50', distinguishing from that of the first embodiment. Because the configuration of the image forming apparatus 100 and the basic configuration of the colorimetric camera 20 are the same as those of the first embodiment, only the light absorption member 50' included in the colorimetric camera 20 of the present embodiment is explained in the following.

Figure 13:
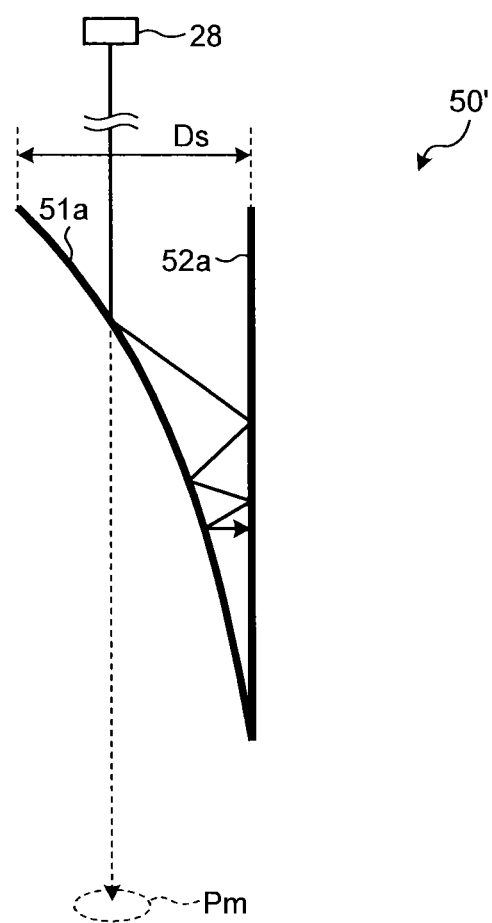
FIG. 13 is a diagram for explaining a function of the light absorption member in which a first surface is formed in a curved surface.
Figure 14:
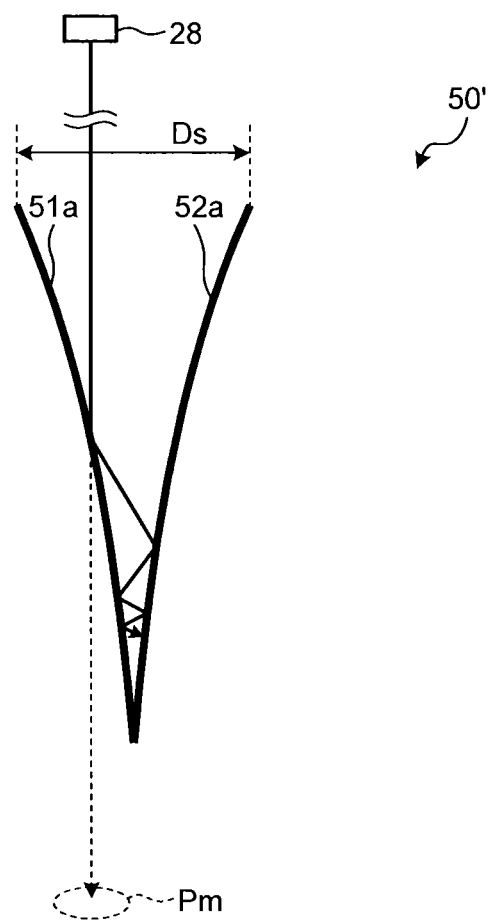
FIG. 14 is a diagram for explaining a function of the light absorption member in which both of the first surface and a second surface are formed in a curved surface.

The light absorption member 50' included in the colorimetric camera 20 of the present embodiment is structured such that at least one of the first surface 51a and the second surface 52a is formed in to a curved surface, and an angle formed between the first surface 51a and the second surface 52a decreases as distance from the illumination light source 28 increases. FIG. 13 is a diagram for explaining a function of the light absorption member 50' in which the first surface 51a is formed in a curved surface, and FIG. 14 is a diagram for explaining a function of the light absorption member 50' in which both of the first surface 51a and a second surface 52a are formed in a curved surface. A gap Ds between the first surface 51a and the second surface 52a at a position closest to the illumination light source 28 is the same as the first embodiment.

The light absorption member 50' included in the colorimetric camera 20 of the present embodiment acts as to close light from the illumination light source 28 toward the specular-reflection position Pm between the first surface 51a and the second surface 52a by forming at least one of the first surface 51a and the second surface 52a into a curved surface as depicted in FIG. 13 and FIG. 14. That is, light from the illumination light source 28 toward the specular-reflection position Pm is gradually attenuated by being repeatedly reflected on the first surface 51a and the second surface 52a of the light absorption member 50', and hardly enters the sensor unit 25. Therefore, the colorimetric camera 20 of the present embodiment enables to absorb the light from the illumination light source 28 toward the specular-reflection position Pm by the light absorption member 50' more efficiently than the first embodiment.

The light absorption member 50' included in the colorimetric camera 20 of the present embodiment may have a structure in which the first member 51 having the first surface 51a and the second member 52 having the second surface 52a are combined similarly to the first embodiment, or may be formed by processing the single material 53.

Figure 15:
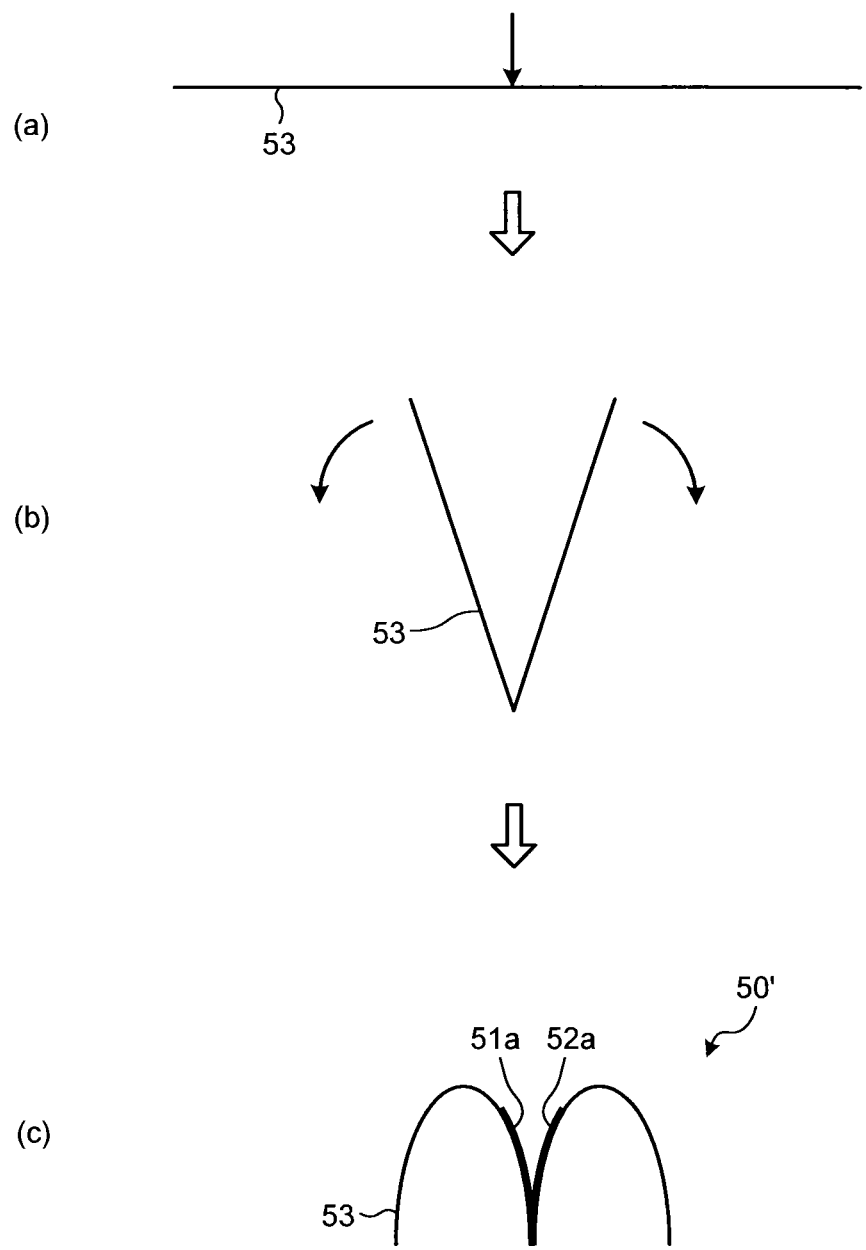
FIG. 15 is a diagram for explaining one example of a process of manufacturing the light absorption member in which both of the first surface and the second surface are formed in a curved surface.

FIG. 15 is a diagram for explaining a process of manufacturing the light absorption member 50' in which both of the first surface 51a and the second surface 52a are formed in a curved surface. In the example depicted in FIG. 15, first, as depicted at (a) in FIG. 15, a folding blade is put on the single material 53 in a thin plate form at a position indicated by an arrow in the figure, and the single material 53 is bent to an acute angle. Next, as depicted at (b) in FIG. 15, pressure is applied to ends of the single material 53 that have been bent to an acute angle toward a direction indicated by arrows in the figured, to bent the single material 53 to be bent as depicted at (c) in FIG. 15. Subsequently, for example, black coating is applied on two surfaces facing to each other of the single material 53 bent as depicted at (c) in FIG. 15, and the applied portions are formed as the first surface 51a and the second surface 52a, and thus, the light absorption member 50' in which the first surface 51a and the second surface 52a are both formed in a curved surface is manufactured.

Figure 16:
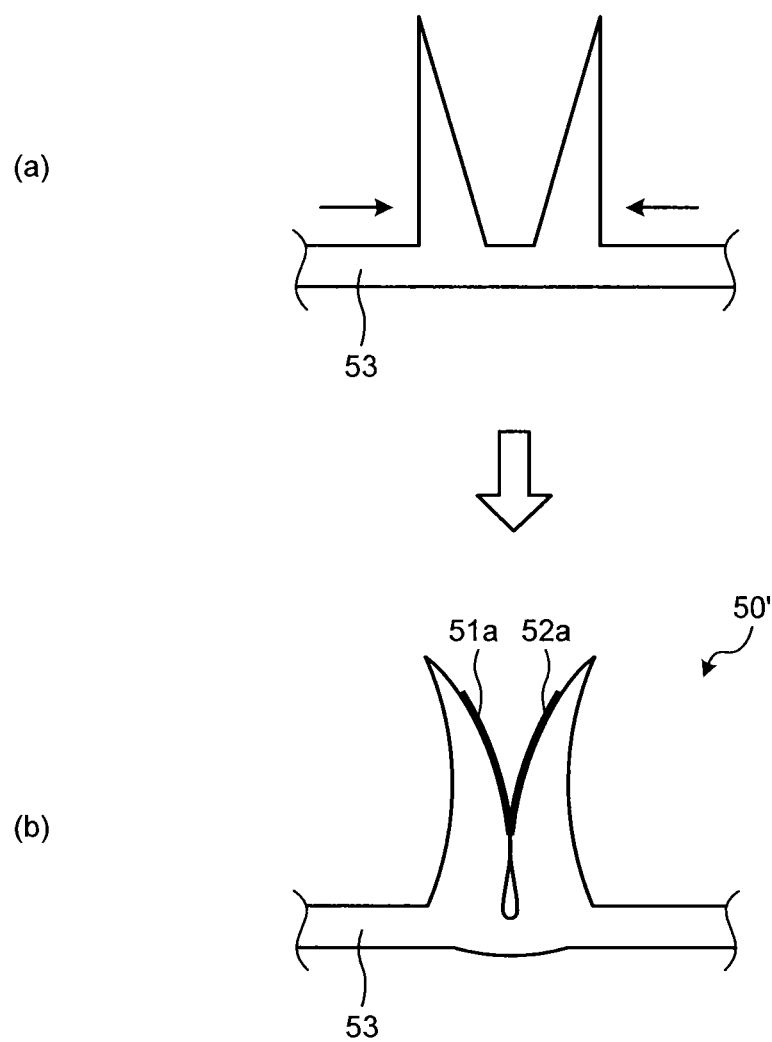
FIG. 16 is a diagram for explaining another example of the process of manufacturing the light absorption member in which both of the first surface and the second surface are formed in a curved surface.

FIG. 16 is a diagram for explaining a process of manufacturing the light absorption member 50' in which both of the first surface 51a and the second surface 52a are formed in a curved surface by deforming the single material 53 that has been molded, by applying pressure. In an example depicted in FIG. 16, first, as depicted at (a) in FIG. 16, pressure is applied to the single material 53 that is made from a resin material and the like molded into a shape having two protrusions toward directions indicated by arrows in the figure so as to bring the two protrusions into contact with each other. Thus, the single material 53 to which pressure is applied is deformed as depicted at (b) in FIG. 16, and the two protrusions are in contact near base portions, and surfaces facing to each other are formed into a curved surface. Subsequently, for example, black coating is applied on these two surfaces facing to each other, and the applied portions are formed as the first surface 51a and the second surface 52a, and thus, the light absorption member 50' in which the first surface 51a and the second surface 52a are both formed in a curved surface is manufactured.

Third Embodiment

Next, a third embodiment is explained. The present embodiment indicates another modification of the light absorption member 50 that is included in the colorimetric camera 20. Hereinafter, the light absorption member 50 of the present embodiment is referred to as a light absorption member 60, distinguishing from that of the first embodiment and the second embodiment. Because the configuration of the image forming apparatus 100 and the basic configuration of the colorimetric camera 20 are the same as those of the first embodiment, only the light absorption member 60 included in the colorimetric camera 20 of the present embodiment is explained in the following.

Figure 17:
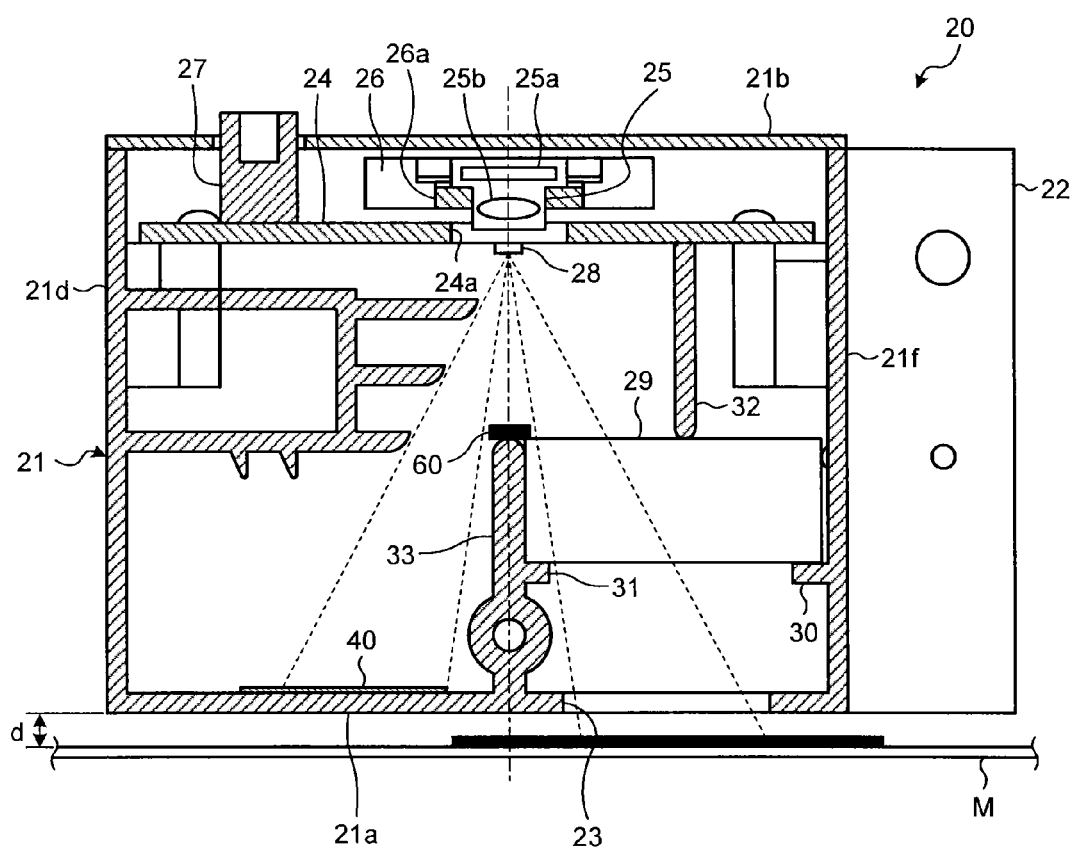
FIG. 17 is a vertical cross-section of the colorimetric camera.

FIG. 17 is a vertical cross-section of the colorimetric camera 20 of the present embodiment, and is a cross-section at the same position as that of the vertical cross-section of the colorimetric camera 20 depicted in FIG. 5. The colorimetric camera 20 of the present embodiment includes the light absorption member 60 in place of the light absorption member 50 of the first embodiment, as depicted in FIG. 17. The light absorption member 60 is arranged, for example, in an optical path of light from illumination light source 28 toward the specular-reflection position Pm, supported by a surface of the optical-path-length changing member 29 closer to the top plate 21b and the supporting member 33.

Figure 18:
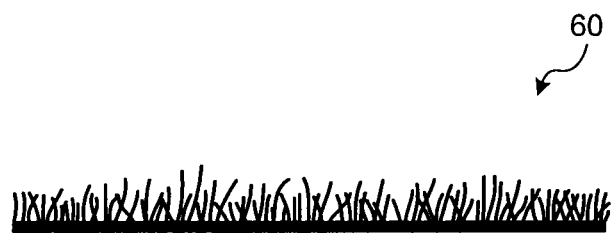
FIG. 18 is a side view of the light absorption member.
Figure 19:
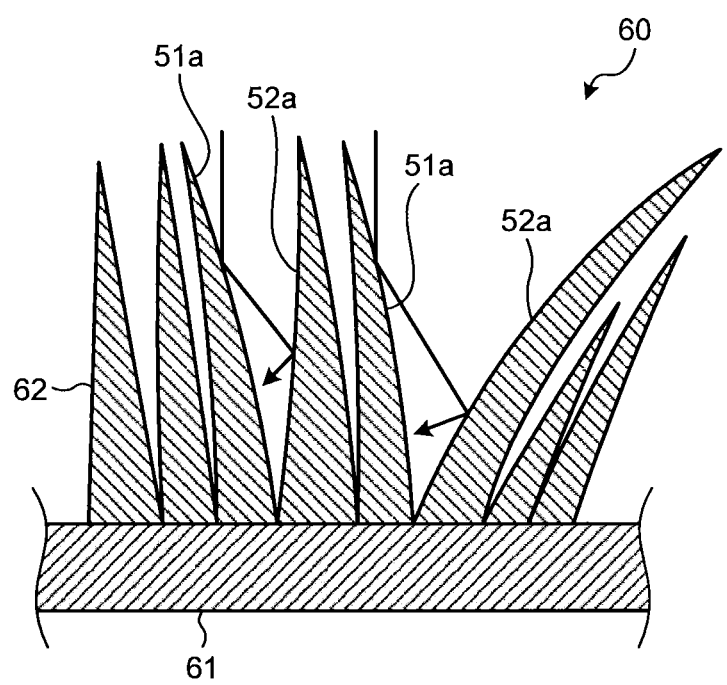
FIG. 19 is a cross-section showing a part of the light absorption member in an enlarged manner.

FIG. 18 is a side view of the light absorption member 60 included in the colorimetric camera 20 of the present embodiment when viewed in a direction perpendicular to an optical axis of the sensor unit 25, and FIG. 19 is a cross-section showing a part of the light absorption member 60 in an enlarged manner. The light absorption member 60 has a structure having a lot of bristle protrusions rising from a base material 61 as depicted in FIG. 19, and surfaces facing to each other of the two adjacent bristle protrusions 62 are to be the first surface 51a and the second surface 52a.

As the light absorption member 60 thus structured, for example a flocked paper can be used. The flocked paper is paper that has a structure similar to raxa, which is a cloth in which carding wool is teased, and one in which black bristle protrusions are planted on a substrate made of paper in black (super black) as, for example, "non-reflective black flocked paper" (http://shop.koyo-opt.co.jp/i-shop/product.pasp?cm_id=156400&to=pr) manufactured by KOYO CORPORATION is commercially available. The bristle protrusions are generally made from polyester resin, polyamide resin, polyolefin resin, insoluble thermoplastic polymer, or the like.

The light absorption member 60 having a lot of the bristle protrusions 62 has a function of attenuating light from the illumination light source 28 toward the specular-reflection position Pm by sequentially reflecting on the first surface 51a and the second surface 52a, similarly to the light absorption member 50 of the first embodiment and the light absorption member 50' of the second embodiment. Therefore, the colorimetric camera 20 having the light absorption member 60 as above sufficiently absorb light from the illumination light source 28 toward the specular-reflection position Pm by the light absorption member 60, thereby enabling to suppress a light amount of reflected light from the light absorption member 60 entering the sensor unit 25, similarly to the colorimetric camera 20 of the first embodiment and the second embodiment. Accordingly, in an image imaged by the sensor unit 25, a signal of a region in which the reflected light from the light absorption member 60 forms an image is not to be close to a saturation level, and an RGB value that is used for colorimetry of a patch or color adjustment of the image forming apparatus 100 can be properly obtained from the image imaged by the sensor unit 25.

Other Modifications

Although the function of calculating a colorimetry value of a patch is provided in the colorimetric camera 20 in the embodiments described above, it may be configured to calculate a colorimetry value externally from the colorimetric camera 20. For example, it can be configured such that the CPU 101 or the control FPGA 110 mounted on the main control board 120 of the image forming apparatus 100 calculates a colorimetry value of a patch. In this case, the colorimetric camera 20 is configured to transmit an RGB value of a patch that is obtained by imaging performed by the sensor unit 25 and an RGB value of a reference patch included in the reference chart 40 to the CPU 101 or the control FPGA 110, instead of a colorimetry value of a patch. That is, the colorimetric camera 20 is configured as an imaging device that does not have a function of calculating a colorimetry value.

Moreover, although the image forming apparatus 100 configured as a serial head inkjet printer is exemplified in the embodiments described above, the present invention is not limited to the example described above, and is applicable to various types of image forming apparatuses effectively. For example, when the present invention is applied to a line head inkjet printer, it may be configured such that multiple units of the colorimetric cameras 20 are arranged in an aligned manner in a direction perpendicular to a conveyance direction of the recording medium M. Furthermore, when the present invention is applied to an electrophotographic image forming apparatus, it may be configured such that multiple units of the colorimetric cameras 20 are arranged in an aligned manner in a direction perpendicular to a conveyance direction of the recording medium M at least at any position in a conveyance path of the recording medium M after fixing. Particularly, when colorimetry of each patch included in a test pattern is performed by using multiple units of the colorimetric cameras 20 while conveying the recording medium M, it is preferable that each patch included in the test pattern be formed as a patch shaped long in the conveyance direction of the recording medium M.

Figure 20:
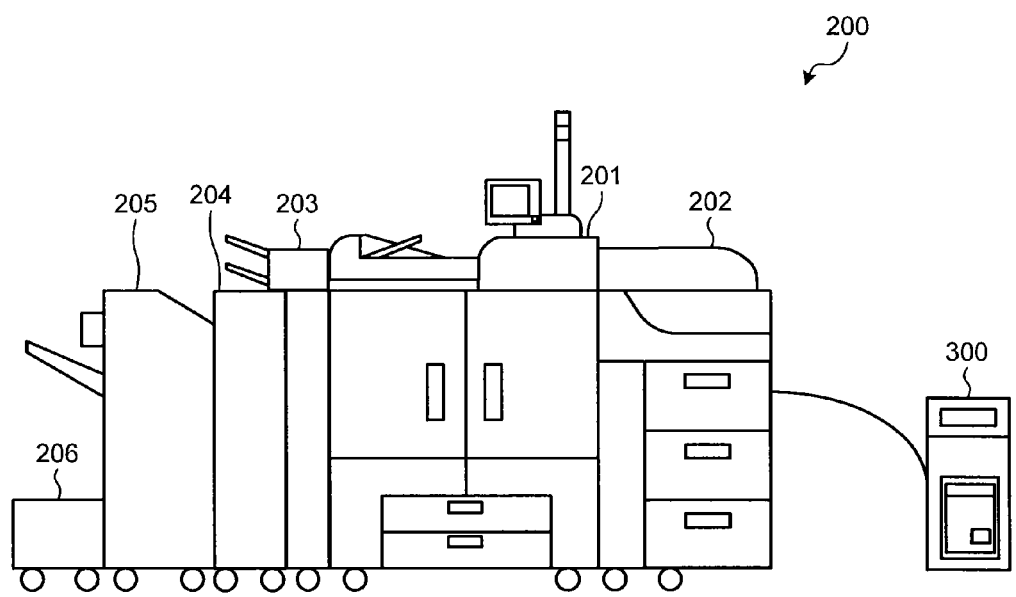
FIG. 20 is an external view of an electrophotographic image forming apparatus that is configured as a production printer.

FIG. 20 is an external view of an electrophotographic image forming apparatus 200 that is configured as a production printer. The image forming apparatus 200 depicted in FIG. 20 uses toner as a coloring material, and includes a main unit 201 (image recording unit) that records an image by electrophotography on the recording medium M. Furthermore, it is configured by combining peripherals, such as a large-capacity paper feeding unit 202 that feeds paper to this main unit 201, an inserter 203 that is used to supply a cover or the like, a folding unit 204 that performs folding processing on the recording medium on which an image is recorded, a finisher 205 that performs stapling and punching, and a cutter 206 that performs cutting, according to a use. Moreover, to this image forming apparatus 200, an external controller 300 called a digital front end (DFE) is connected.

Figure 21:
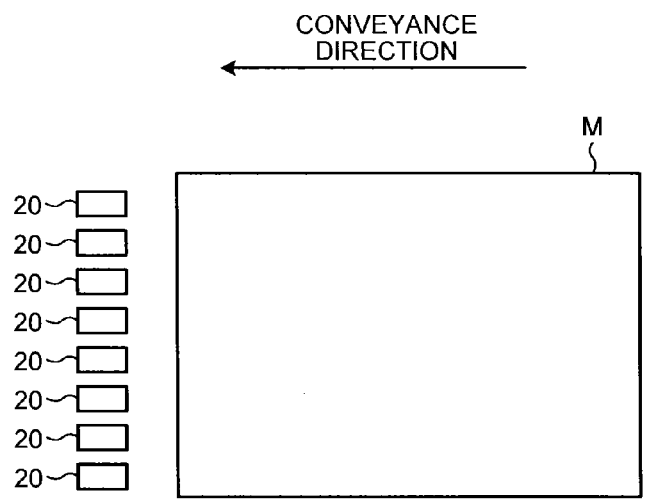
FIG. 21 is a diagram for explaining an arrangement example of the colorimetric cameras in the electrophotographic image forming apparatus.

In the electrophotographic image forming apparatus 200 thus configured, multiple units of the colorimetric cameras 20 are arranged in an aligned manner in a direction perpendicular to a conveyance direction of the recording medium M, for example, in a conveyance path of the recording medium M inside the finisher 205. FIG. 21 is a diagram for explaining an arrangement example of the colorimetric cameras 20 in this case. In an example depicted in FIG. 21, eight units of colorimetric cameras 20 are arranged in an aligned manner in a direction perpendicular to a conveyance direction of the recording medium M.

When the recording medium M on which a test pattern is recorded by the main unit 201 is conveyed, these colorimetric cameras 20 perform imaging by the sensor unit 25 with timing when a patch included in the test pattern comes to a position opposing to the opening portion 23 arranged in the casing 21, and acquire an RGB value of the patch. The colorimetric cameras 20 transmit the RGB value of the patch acquired by imaging by the sensor unit 25, or a colorimetry value of the patch that is calculated based on this RGB value, to the main unit 201. In the main unit 201, adjustment of a toner amount (color adjustment) to be adhered onto the recording medium M, by using the RGB value of the patch or the colorimetry value of the patch transmitted from the colorimetric cameras 20 is performed. Note that if it is configured such that the recording medium M after fixing is cooled sufficiently inside the main unit 201, the colorimetric cameras 20 may be arranged in a conveyance path inside the main unit 201 in which the cooled recording medium M is conveyed, in an aligned manner in a direction perpendicular to a conveyance direction of the recording medium M.

A control function of respective components constituting the image forming apparatuses 100, 200, and the colorimetric camera 20 of the embodiments and the modifications described above can be implemented by hardware or software, or a combined configuration of the both. When the control function of respective components constituting the image forming apparatuses 100, 200, and the colorimetric camera 20 (imaging device) is implemented by software, a processor equipped in the image forming apparatuses 100, 200, and the colorimetric camera 20 executes a program in which a processing sequence is described. The program that is executed by the processor is, for example, provided by being installed in a ROM inside the apparatuses 100, 200, and the colorimetric camera 20 (imaging device) in advance. Moreover, the program that is executed by the processor may be provided by being recorded in a computer-readable recording medium such as a compact disk (CD)-ROM, a flexible disk (FD), a CD-recordable (CD-R), and digital versatile disk (DVD) in a file of a installable format or an executable format.

Furthermore, the program that is executed by the processor may be configured to be stored in a computer that is connected to a network such as the Internet, and provided by being downloaded through the network. Moreover, the program that is executed by the processor may be configured to be provided or distributed through a network such as the Internet.

According to an embodiment, an effect that an RGB value of a subject can be properly acquired is provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device comprising:
 a casing that includes an opening portion;
 a reference chart that is arranged at a different position from the opening portion of the casing;

a sensor unit that is arranged at a predetermined position inside the casing, and that images a subject outside the casing through the opening portion, with a part of an imaging region, while imaging the reference chart with another part of the imaging region;

an illumination light source that illuminates at least the imaging region of the sensor unit; and a light absorption member that is arranged in an optical path of light from the illumination light source toward a specular-reflection position, when a position from which specular-reflection light of the illumination light source is entered to the sensor unit, in the imaging range of the sensor unit is the specular-reflection position, wherein the light absorption member has at least a first surface on which light from the illumination light source toward the specular-reflection position is irradiated, and a second surface that faces to the first surface, and reflected light that has been reflected on the first surface and then on the second surface is further directed toward the first surface.

2. The imaging device according to claim 1, wherein the first surface and the second surface are arranged such that a gap therebetween decreases as distance from the illumination light source increases.

3. The imaging device according to claim 2, wherein at least one of the first surface and the second surface is formed in a curved surface, and an angle formed between the first surface and the second surface decrease as distance from the illumination light source increases.

4. The imaging device according to claim 2, wherein the first surface and the second surface contact with each other at a furthest position from the illumination light source.

5. The imaging device according to claim 1, wherein the light absorption member includes a first member that has the first surface, and a second member that has the second surface, and the first member and the second member are arranged in such a manner that that first surface and the second surface face to each other.

6. The imaging device according to claim 1, wherein the light absorption member is formed to have the first surface and the second surface by processing a single material.

7. The imaging device according to claim 1, wherein the light absorption member has a plurality of bristle protrusions, and surfaces of two adjacent bristle protrusions facing to each other are the first surface and the second surface.

8. A colorimetry device comprising:
an imaging device according to claim 1; and
a colorimetry calculating unit that calculates a colorimetry value of the subject by using an image that is imaged by the sensor unit.

9. An image forming apparatus comprising:
a colorimetry device according to claim 8; and
an image recording unit that records an image on a recording medium by using a coloring material, wherein
the subject is an image that is recorded on the recording medium by the image recording unit, and
an amount of the coloring material used by the image recording medium is adjusted based on a colorimetry value of the subject that is calculated by the colorimetry calculating unit.

10. An image forming apparatus comprising:
the imaging device according to claim 1; and
an image recording unit that records an image on a recording medium by using a coloring material, wherein
the subject is an image that is recorded on the recording medium by the image recording unit, and
an amount of the coloring material used by the image recording medium is adjusted based on an image that is imaged by the sensor unit.

\* \* \* \* \*